Feb. 21, 1956
B. E. HOUSE
2,735,513
BRAKE MECHANISM
Filed Nov. 6, 1953
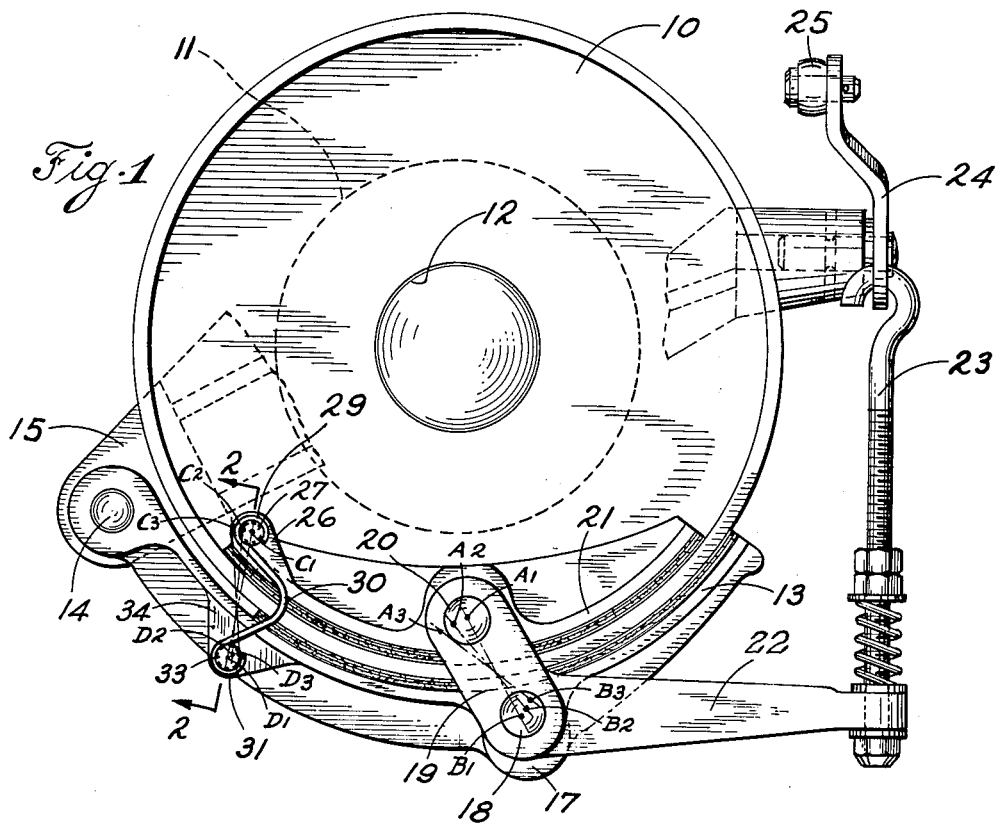
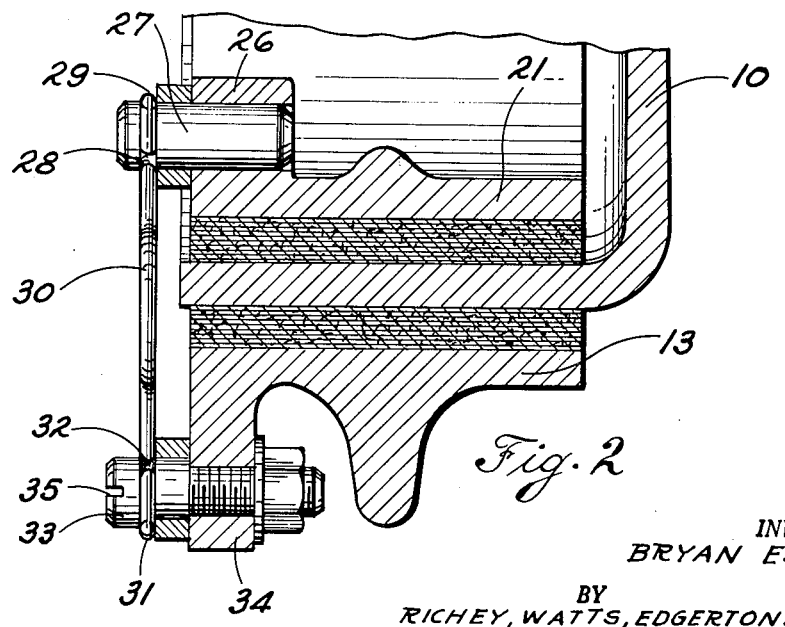
INVENTOR.
BRYAN E. HOUSE
BY
RICHEY, WATTS, EDGERTON & McNENNY
A H Edgerton
ATTORNEYS

2,735,513

BRAKE MECHANISM

Bryan E. House, Ashtabula, Ohio, assignor to Detroit Duo-Grip Brake Corporation, Detroit, Mich., a corporation of Michigan Application November 6, 1953, Serial No. 390,546

5 Claims. (Cl. 188—76)

This invention relates broadly to brakes for automotive vehicles and more specifically to improvements in brakes of the type that embody a forked bell crank organized to effect the simultaneous engagement of the inner and outer brake shoes with the drum. A brake of this character is disclosed in my copending application, Serial No. 360,937, filed June 11, 1953, entitled "Brake Mechanism."

In detail, the invention pertains to a brake shoe supporting structure including an arcuate wire spring which is arranged to unite the inner shoe with the outer shoe, and designed to alter the movement of the trailing end of the inner shoe proportional to the movement of the central portion thereof consequent the oscillation of the brake actuating fork.

Further objects and advantages of the invention reside in the provision of a brake shoe support which will restrain vibration of the parts of the assembly, a mechanism which will effect uniform wear of the brake lining, and a brake which is economic of manufacture, installation and maintenance.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 1 is a front elevational view of a brake embodying the improved brake shoe support.

Fig. 2 is a transverse sectional view thereof, the section being taken on a plane indicated by the line 2—2 in Fig. 1.

Referring first to Fig. 1, the brake comprises a brake drum 10 bolted to a flange 11 secured in the customary manner to the vehicle propeller shaft 12. One end of the outer brake shoe 13 is mounted for pivotal movement on a journal 14 formed in a bracket 15 secured to the transmission case not shown. The opposed end of the shoe is provided with a boss 17 apertured to receive a pintle 18 formed in a yoke 19 having a second pintle 20 thereon for the pivotal support of the inner brake shoe 21. The yoke is disposed in straddled relation with the flanged portion of the brake drum 10 and is provided with an actuating lever 22 coupled with a link 23 which in turn is connected to a bell crank 24 having the second arm thereof connected to a pull rod 25 and brake lever not shown.

The inner brake shoe 21 is formed with a boss 26 on the outer edge of the inner face thereof, which is drilled and reamed to receive a stud 27, pressed or otherwise secured in place with the outer end thereof protruding beyond the edge of the brake drum 10. The outboard end of the stud is machined with a groove 28 therein which constitutes the seat for the coiled end 29 of a semi-elliptic wire spring 30. The opposed end of the spring terminates in a coil 31 engaged in a groove 32 in the head of a pin 33, mounted in a boss 34 in the outer edge of the external brake shoe adjacent the journal 14. The head of the pin is eccentric to the shank thereof and a screwdriver slot 35 is provided therein to accommodate initial adjustments of the spring. When the brake is applied, the bell crank yoke 19 will rotate about its fulcrum in the outer shoe and swing the pintles 18 and 20 toward the flange of the brake drum in the manner indicated by the center line reference characters A–1–2 and B–1–2 (Fig. 1). As such movement occurs, the center of the pin 33 will swing upwardly proportional to the movement of the pintle 18 as determined by the location of the journal 14 and pin 33. As the pin center "D" swings to the position D–1, D–2, etc., the spring 30 will swing the stud 27 downwardly to C–1–2, etc., proportional to the movement of the pin 33 and pintle 20, as determined by the normal relation of the centers A—C and C—D.

From the foregoing it will be seen that the spring not only supports the ends of the inner brake shoe in spaced relation with the drum when the brake is released, but also draws the shoe into concentric relation therewith when energized by the forked bell crank.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A brake shoe assembly comprising a flanged brake drum, a bellcrank, pintles thereon disposed in straddled relation with the flange of said drum, a fixed outer brake shoe pivot post, an outer brake shoe fulcrumed thereon and upon the outer pintle of said bell crank, an inner brake shoe fulcrumed on the inner pintle of the bell crank and a spring wire loop mounted for tensive adjustment on the outer brake shoe adjacent said fixed post and upon the adjacent end of said inner shoe.

2. In a brake embodying a flanged brake drum, a forked bell crank arranged with the arms thereof in straddled relation with the brake drum flange and inner and outer brake shoe pivotally mounted on said arms, mechanism for the retention of said shoes in concentric relation with the brake drum flange comprising a fixed pin, one end of the outer brake shoe pivoted thereon, a second pin mounted for rotative adjustment on the outer shoe intermediate the fixed pin and the pivotal connection of the outer shoe with the arm of the forked bellcrank, an eccentric shank on the last named pin, and a spring wire loop pivotally connected to the inner brake shoe and the eccentric shank of the last named shoe.

3. A brake assembly comprising a flanged brake drum, a forked bell crank having the arm thereof disposed in straddled relation with the brake drum flange, an outer brake shoe mounted on a fixed pivot and fulcrumed on the outer arm of said bell crank, an inner brake shoe fulcrumed on the inner arm of said bell crank, a pin in the outer brake shoe intermediate said fixed pin and the outer fork arm, and a spring wire loop uniting said pin with the contiguous end of the inner brake shoe.

4. In a brake embodying a flanged brake drum, an outer brake shoe fulcrumed on a fixed pivot, a forked bell crank pivoted on said shoe adjacent the free end thereof, an inner brake shoe pivoted on said bell crank, a curved spring wire link coupled with the outer brake shoe and an adjacent portion of the inner shoe, and means in the outer brake shoe for tensive adjustment of the curved wire spring.

5. In a brake embodying a flanged brake drum, a forked bell crank constituting a brake shoe actuating member, an outer brake pivoted on a fixed post and fulcrumed on the forked bell crank and an inner brake shoe fulcrumed on the forked bell crank, means for supporting the inner shoe in concentric relation with the brake drum flange comprising a pivot pin mounted in the outer edge of an end portion of the inner shoe, an eccentric pivot pin mounted on the outer edge of the outer shoe intermediate said fixed pivot and the bell crank fulcrum, and an arcuate spring wire link pivoted on said eccentric pin and on said inner brake shoe.

References Cited in the file of this patent

UNITED STATES PATENTS

| | | |
|---|---|---|
| Re. 20,779 | Garand | July 5, 1938 |
| 1,511,976 | Markham | Oct. 14, 1924 |
| 1,972,203 | Sanford | Sept. 4, 1934 |
| 2,096,462 | McGowan | Oct. 19, 1937 |
| 2,143,998 | Rosenberg | Jan. 17, 1939 |
| 2,239,977 | Rosenberg | Apr. 29, 1941 |

FOREIGN PATENTS

| | | |
|---|---|---|
| 773,093 | France | Aug. 25, 1934 |